US010582159B2

(12) United States Patent
Thakkar et al.

(10) Patent No.: US 10,582,159 B2
(45) Date of Patent: Mar. 3, 2020

(54) SYSTEM AND METHODS FOR AGGREGATED MEETING JOINING FOR VIDEO CONFERENCES WITH BUILT IN RESILIENCE TO ALLOW FOR A COMMON MEETING EXPERIENCE

(71) Applicant: Blue Jeans Network, Inc., Mountain View, CA (US)

(72) Inventors: Deepesh Thakkar, Sunnyvale, CA (US); Rohit Sonalkar, San Jose, CA (US); Swaroop Kulkarni, San Jose, CA (US)

(73) Assignee: Blue Jeans Network, Inc., San Jose, CA (US)

( * ) Notice: Subject to any disclaimer, the term of this patent is extended or adjusted under 35 U.S.C. 154(b) by 0 days.

(21) Appl. No.: 15/804,832

(22) Filed: Nov. 6, 2017

(65) Prior Publication Data

US 2019/0141292 A1 May 9, 2019

(51) Int. Cl.
*H04N 7/15* (2006.01)
*H04L 12/18* (2006.01)
*H04L 29/06* (2006.01)

(52) U.S. Cl.
CPC ......... *H04N 7/152* (2013.01); *H04L 12/1818* (2013.01); *H04L 65/1069* (2013.01); *H04L 65/403* (2013.01)

(58) Field of Classification Search
CPC combination set(s) only.
See application file for complete search history.

(56) References Cited

U.S. PATENT DOCUMENTS

| 2004/0180689 | A1* | 9/2004 | Nayak | H04W 8/18 455/552.1 |
| 2008/0022356 | A1* | 1/2008 | Tanaka | H04L 9/0891 726/1 |
| 2008/0069328 | A1* | 3/2008 | Bostick | H04M 3/382 379/202.01 |
| 2011/0268011 | A1 | 11/2011 | Mao | |

(Continued)

FOREIGN PATENT DOCUMENTS

| EP | 2661147 A2 | 7/2013 |
| WO | 2016/040366 A1 | 3/2016 |

OTHER PUBLICATIONS

International Search Report and Written Opinion dated Mar. 1, 2019, from the ISA/European Patent Office, for International Patent Application No. PCT/US2018/058950 (filed Nov. 2, 2018), 17 pages.

*Primary Examiner* — Phung-Hoang J Nguyen
(74) *Attorney, Agent, or Firm* — Ascenda Law Group, PC

(57) ABSTRACT

A server receives a user device request from a user device to connect to a video conference. The server authenticates the user device request to access the video conference. The server and user device perform a plurality of data exchanges between the server and user device in order to configure a video conference connection according to a set of user device capabilities and account permissions. The server defaults to a predefined configuration connection state when a failure of the data exchanges is detected in order to provide the user device with a minimum connection state to the video conference. The server connects the user device to the video conference in accordance with the configuration state determined by the server.

15 Claims, 8 Drawing Sheets

(56) References Cited

U.S. PATENT DOCUMENTS

| | | |
|---|---|---|
| 2011/0276699 A1 | 11/2011 | Pedersen |
| 2012/0159354 A1 | 6/2012 | Van Wei |
| 2012/0275349 A1* | 11/2012 | Boyer ................ H04L 12/1822 370/261 |
| 2013/0194163 A1* | 8/2013 | Oh ........................ G08G 1/123 345/2.3 |
| 2014/0082416 A1* | 3/2014 | Mishra ................ H04M 3/567 714/18 |
| 2014/0089503 A1* | 3/2014 | Thyni ................ H04L 41/0668 709/224 |
| 2014/0313282 A1 | 10/2014 | Ma et al. |
| 2014/0316543 A1* | 10/2014 | Sharma ................ G06F 3/1454 700/94 |
| 2015/0120942 A1* | 4/2015 | Ahmadi ................ H04L 47/70 709/226 |
| 2015/0244979 A1* | 8/2015 | Andrada ................ H04N 7/148 348/14.07 |
| 2015/0304609 A1* | 10/2015 | Ma ........................ H04N 7/147 348/14.07 |
| 2017/0312626 A1* | 11/2017 | Colenbrander ....... A63F 13/355 |

* cited by examiner

SYSTEM AND METHODS FOR AGGREGATED MEETING JOINING FOR VIDEO CONFERENCES WITH BUILT IN RESILIENCE TO ALLOW FOR A COMMON MEETING EXPERIENCE

FIELD OF THE INVENTION

The present invention is directed to providing video conference systems with built in resilience.

BACKGROUND

Individuals and groups collaborating on a project often join a video conference with different endpoint hardware, including cellular phones, desktop computers, tablet computers, etc. Capabilities and permissions for each endpoint joining a video conference can be different. For example, a user connecting to a video conference via a desktop computer may have the ability to view multiple users and utilize an integrated chat feature, thanks to a high bandwidth connection and high speed graphics and other processing components. Alternatively, a user connecting to a video conference via a smartphone may have the ability to only view one speaker at a time (due to a smaller display screen), little or no ability to use a chat feature, and be connected over a communication link with limited bandwidth. Further, each user and/or endpoint may be limited in terms of account permissions during the video conference. As an example, the organizer may be the only user/endpoint permitted to enable a record function, or to use a chat feature during a particular video conference.

With such capabilities and permissions in mind, during connection to a video conference, multiple application programming interface (API) calls are made, either by the endpoint, the video conference server, or both, in order to properly set up a connection between a particular endpoint and the video conference server. Typically, the endpoint will be authenticated, details of the capabilities and account permissions for the particular user/endpoint will be determined by the video conference server, and the connection between the endpoint and the server established in accordance with the negotiated parameters. Sometimes, however, an API call will fail, either due to a mismatched permission or capability, or for some other reason. When such a failure occurs, the server typically rejects the attempted connection by the endpoint to the video conference. The user is therefore forced to attempt the connection again from the beginning.

SUMMARY

Rather than rejecting connections when API calls during a setup process fail, the present invention provides resilience in video conference systems. Embodiments are described for connecting a user device to a video conference via a client session configured with a set of default features in cases of connection setup failure. In some embodiments, a server receives a user device request to connect to a video conference. The server authenticates the user device request to access the video conference. The server and user device perform a plurality of data exchanges with the client device in order to configure a video conference connection according to a set of user device capabilities and account permissions. In the event of a failure of the data exchanges, the server defaults to a predefined configuration connection state in order to provide the user device with a minimum connection state to the video conference. The server connects the user device to the video conference in accordance with the configuration state determined by the server.

DETAILED DESCRIPTION

Figure 1:
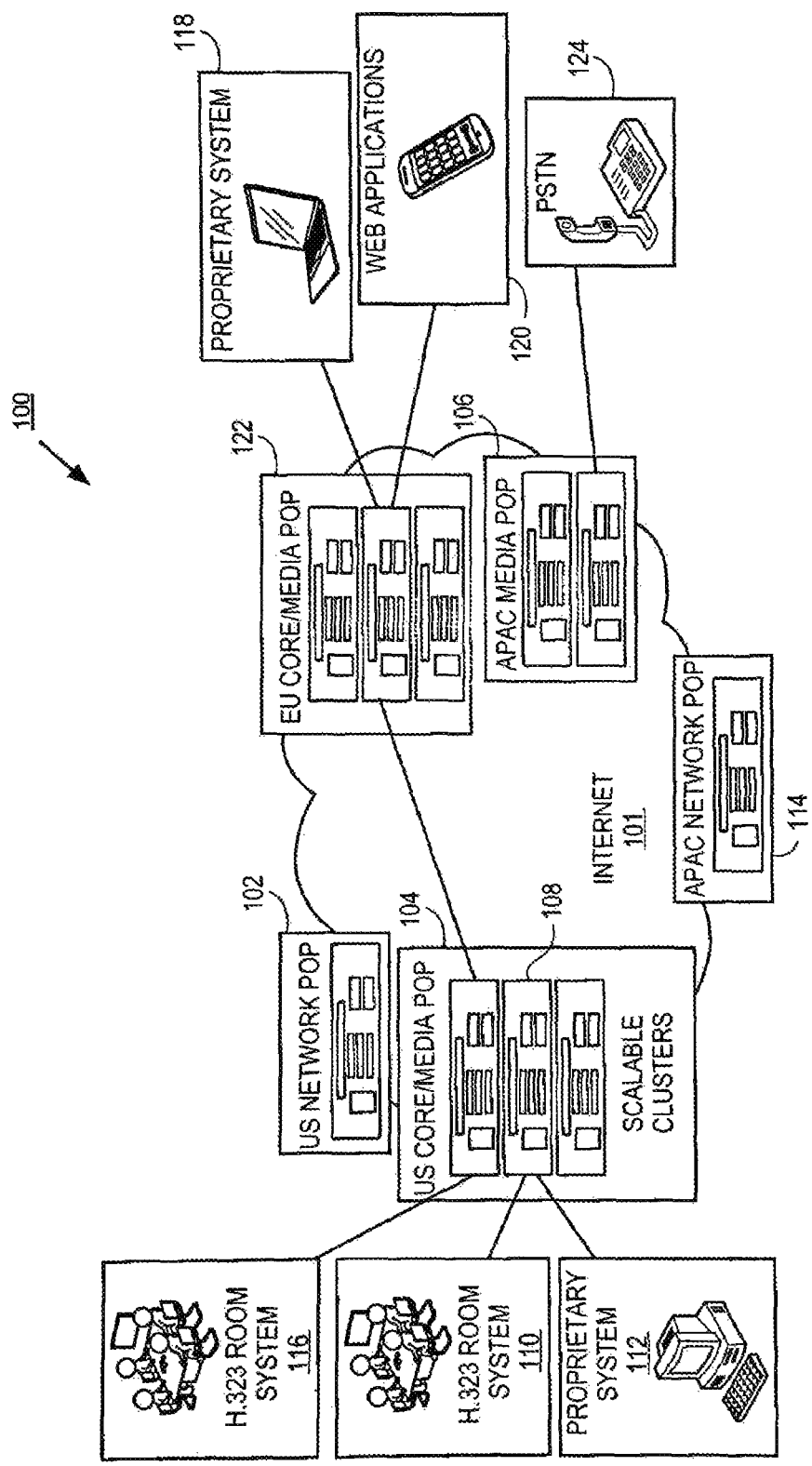
FIG. 1 depicts an exemplary video conferencing system in accordance with some embodiments of the invention.

Embodiments of apparatuses, computer systems, computer readable mediums, and methods for a video conference system involving built-in resilience are described. In some embodiments, a server receives a user device (endpoint) request to connect to a video conference. The server authenticates the user device request to access the video conference. The server and user device perform a plurality of data exchanges, via one or more API calls between the server and user device, in order to configure a video conference connection according to a set of user device capabilities and account permissions. When a failure of an API call is detected, the server defaults to a predefined configuration connection state in order to provide the user device with a minimum connection state to the video conference. The minimum connection state, or one or more default states, are fallback positions that the server will revert to in case of connection setup failure, permissions mismatch, or other such error in setting up the user device, to provide for a successful connection to a video conference but with a reduced connection state (e.g. limited or restricted features, lower bandwidth video stream, etc.). The server connects the user device to the video conference in accordance with the configuration state determined by the server.

In addition, in various embodiments of the invention, the default, predefined configuration connection state is propagated to other participant connections to the video conference so that all participants will have a common conference experience. Alternatively, or in addition, the default, predefined configuration connection state need not be associated only with an initial conference connection request. For example, during a video conference, one or more participants may experience degrading networks conditions. In such an event, one or more connection state parameters may be reconfigured to a default, predefined configuration connection state (for just those participants experiencing connection issues, or for all participants to ensure a common conference experience). To accommodate such graceful degradation of a connection state, default, predefined configuration connection state values for various connection parameters may be cached or stored in memory for quick recall by a video conference server and application as needed. To that end, connection states for each conference participant may be monitored during the conference and assessed against preferred conference state parameter values to determine whether or not a particular conference state configuration state parameter should be reverted to its default, predefined configuration connection state value.

The video conference system may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

FIG. 1 depicts an exemplary video conferencing system 100, in accordance with some embodiments of the invention. The video conferencing system 100 may include one or more points of presence (POPs—e.g., POPs 102, 104, 106, and 114). The POPs may be respectively organized to comprise scalable clusters of nodes, such as media processing nodes 210, as described in connection with FIG. 2 below. Media processing nodes are used to process and compose video conference feeds from various endpoints (e.g., 116, 10, 112, 118, 120, and 124). In certain embodiments, media processing nodes are multipoint control units (MCUs). In certain embodiments, the media processing nodes associated with a POP may work together (and, in some embodiments, work with other POP components) to collectively function as an MCU. In some embodiments, a clustered design makes use of network layer multicast and a multi-bit-rate stream distribution scheme to allow scaling. In certain embodiments, media processing nodes may be implemented with off-the-shelf components, such as Linux/x86 Central Processing Units (CPUs) and PC Graphics Processing Units (GPUs) instead of custom hardware. MCUs based on clusters of media processing nodes can be deployed in a rack-and-stack cloud-computing style and hence achieve the a scalable and cost/performance-efficient approach to support a video conferencing service. Video conferencing system 100 may be used for media stream distribution processing that may be achieved locally on a Local Area Network (LAN) present in each POP and/or across multiple POPs on the Wide Area Network (WAN).

In some embodiments, video conferencing system 100 may be implemented with clusters of x86 servers (e.g., server 108) both locally on a LAN as well as across geographies serving as the media processing nodes for the MCUs to achieve near unlimited scaling. Endpoints may be, for example, room systems running H.323 (as shown with 110), PCs running H.323, PCs or mobile devices running Skype or Microsoft Lync (as shown with 112).

By way of a non-limiting example, video conferencing system 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers.

In some embodiments, the video conferencing system 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
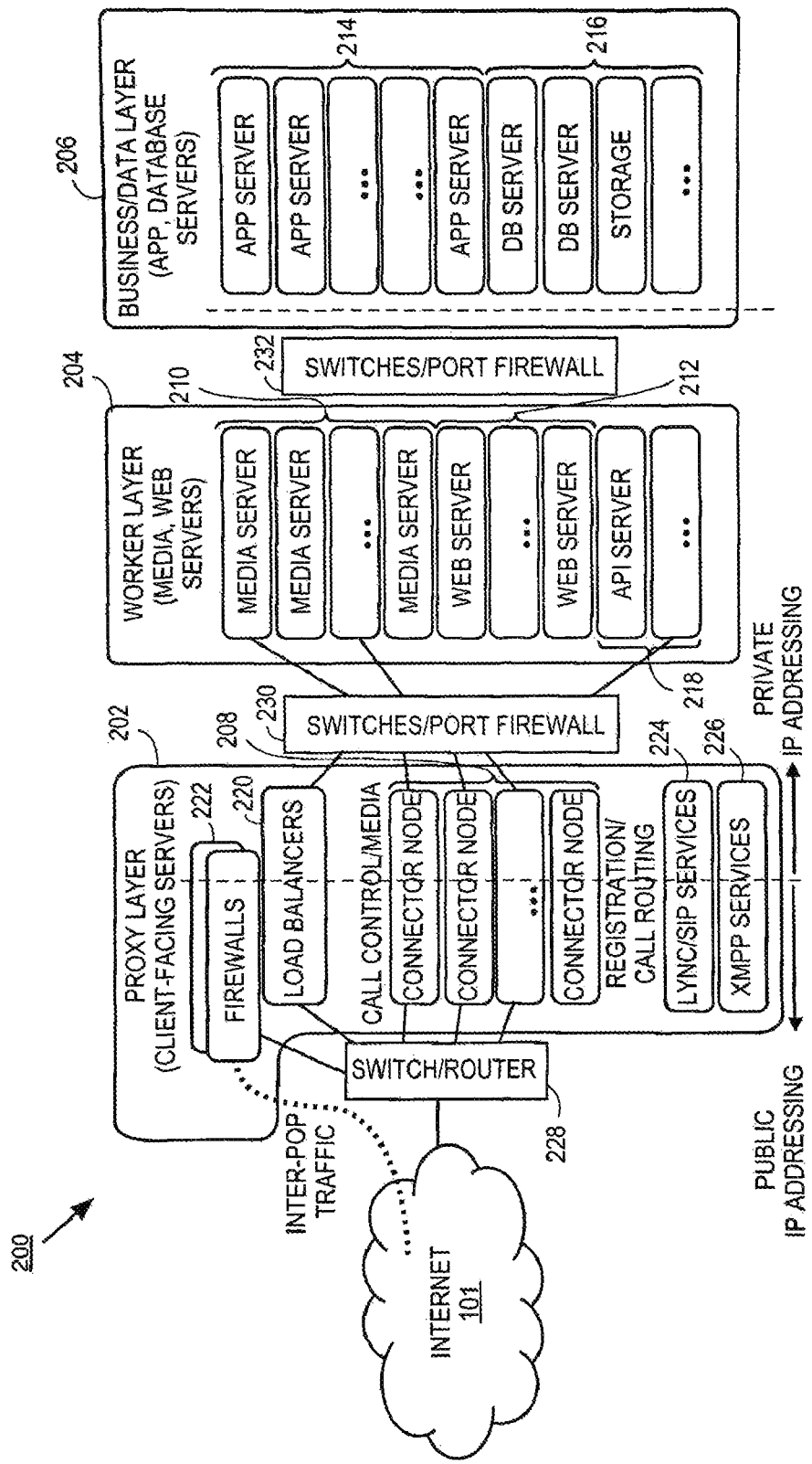
FIG. 2 depicts an exemplary POP media processing node architecture in accordance with some embodiments of the invention.

FIG. 2 depicts an exemplary POP media processing node architecture 200 (e.g., architecture for POPs 102, 104, 106, 114, and 122) accessible over a network 101 with a Proxy Layer 202, a Worker Layer 204, and a Business/Data Layer 206. Some of the components/elements of the POP 200 include but are not limited to, the following: load balancers 220, firewalls 222, media processing nodes (media servers) collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the video conferencing system 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media processing nodes 210 of the Worker Layer 204, with such operation of the media processing nodes 210 used to form composite data streams for the endpoints. Translating (when needed) may include receiving the data packets of a data stream communicated using a first communication protocol and retransmitting the received data packets using a second communication protocol.

In some embodiments, application server 214 (e.g., a user experience engine) renders multimedia content including but not limited to the composite audio/video stream to each of the participants to the video conference via one or more user interfaces.

Figure 3:
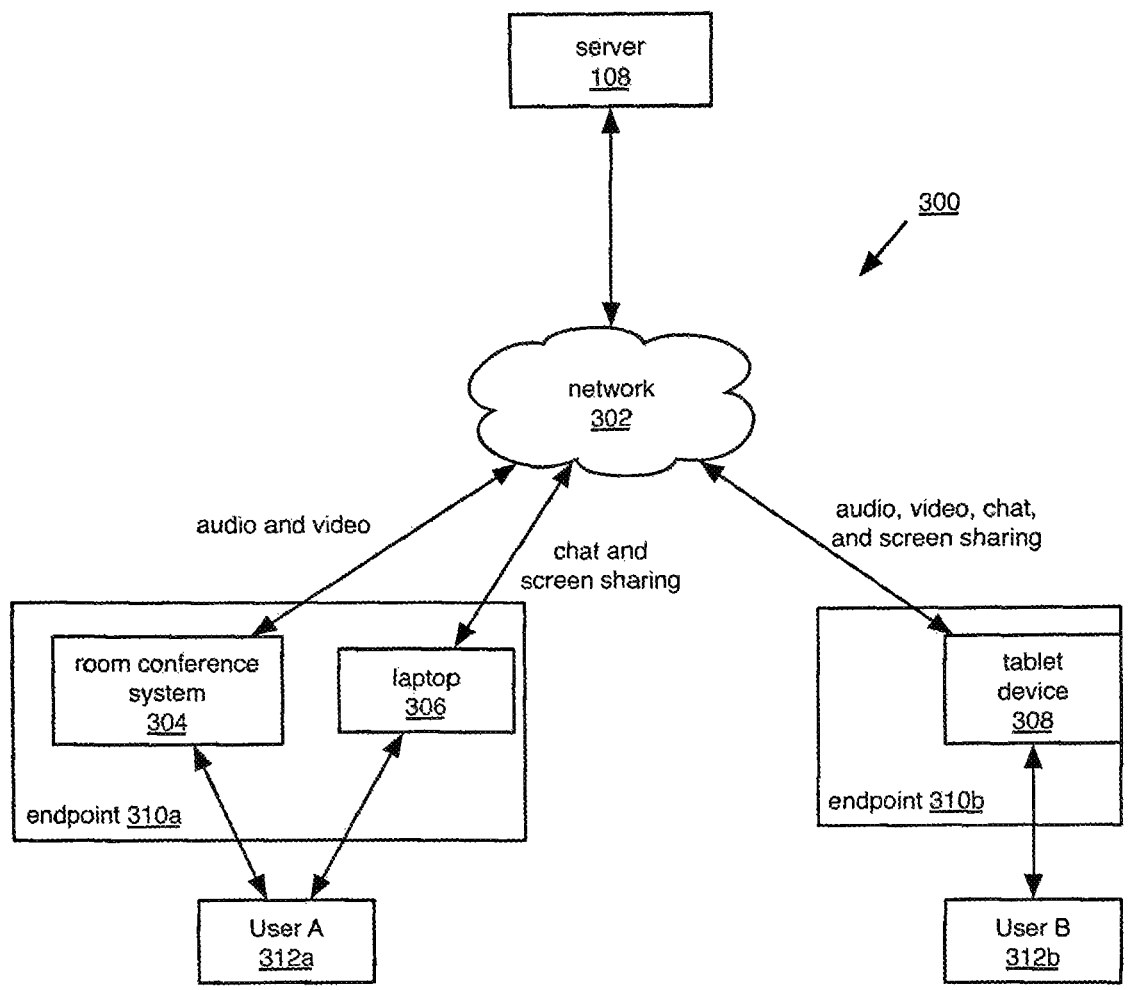
FIG. 3 depicts exemplary components of a video conferencing system in accordance with some embodiments of the invention.

FIG. 3 shows exemplary components of a video conferencing system 300, in which multiple devices may form a single video conference endpoint, each device with its own set of capabilities. A user can join a video conference call with (i) a room conference system that can be used for audio and video, (ii) a tablet device or laptop that can be used for screen sharing, and (iii) a smart phone that can be used for chat, all of these electronic devices forming a single video conference endpoint. In the embodiment shown in FIG. 3, room conference system 304 and laptop 306 are associated as a single endpoint 310a with User A (312a), and tablet device 308 forms a second endpoint 310b associated with User B (312b). In a video conference facilitated by a room conference system with limited capabilities (e.g., no chat possible), a mobile device (e.g., mobile phone, tablet computer, laptop computer, etc.) can be used to supplement the capabilities of the room conference system (e.g., provide chat).

Server 108 may support a set of capabilities, such as audio, video, chat, screen sharing and the like, for each user. A user can join a video conference with a first device that is capable of supporting audio/video and a second device that is better suited for content sharing and chat. Server 108 may associate a first user with both the first and second devices, and consequently can determine the communication modes (i.e., audio, video, content sharing and chat) that are associated with the first user. Server 108 may be a component of video conferencing system 100, such as a server of POP media processing node architecture 200. Network 302 may be a WAN, the internet, a telecommunications network, a LAN, or the like.

In certain embodiments, the user may identify himself/ herself at the time of joining a video conference with a device, by pairing the device with another device already joined into the video conference. For instance, after a first user joins a video conference using a first device, server 108 may provide the first user with a short alphanumeric code that can be used to associate any further devices that join the video conference with the first user. That is, the first user can join a second device into the video conference by entering the short alphanumeric code on the second device; the second device may then provide the short alphanumeric code to server 108; and server 108 may then associate both the first and second devices with the first user.

In addition, and/or alternatively, pairing may be heuristically determined by the server. For instance, server 108 may detect similar audio signals (e.g., similarity being measured based on the correlation between two signals) being received from a first device and a second device. As such correlation may indicate two devices being used by the same user, server 108 may then associate the first and second devices with the same user (and/or with the same video conference endpoint).

Figure 4:
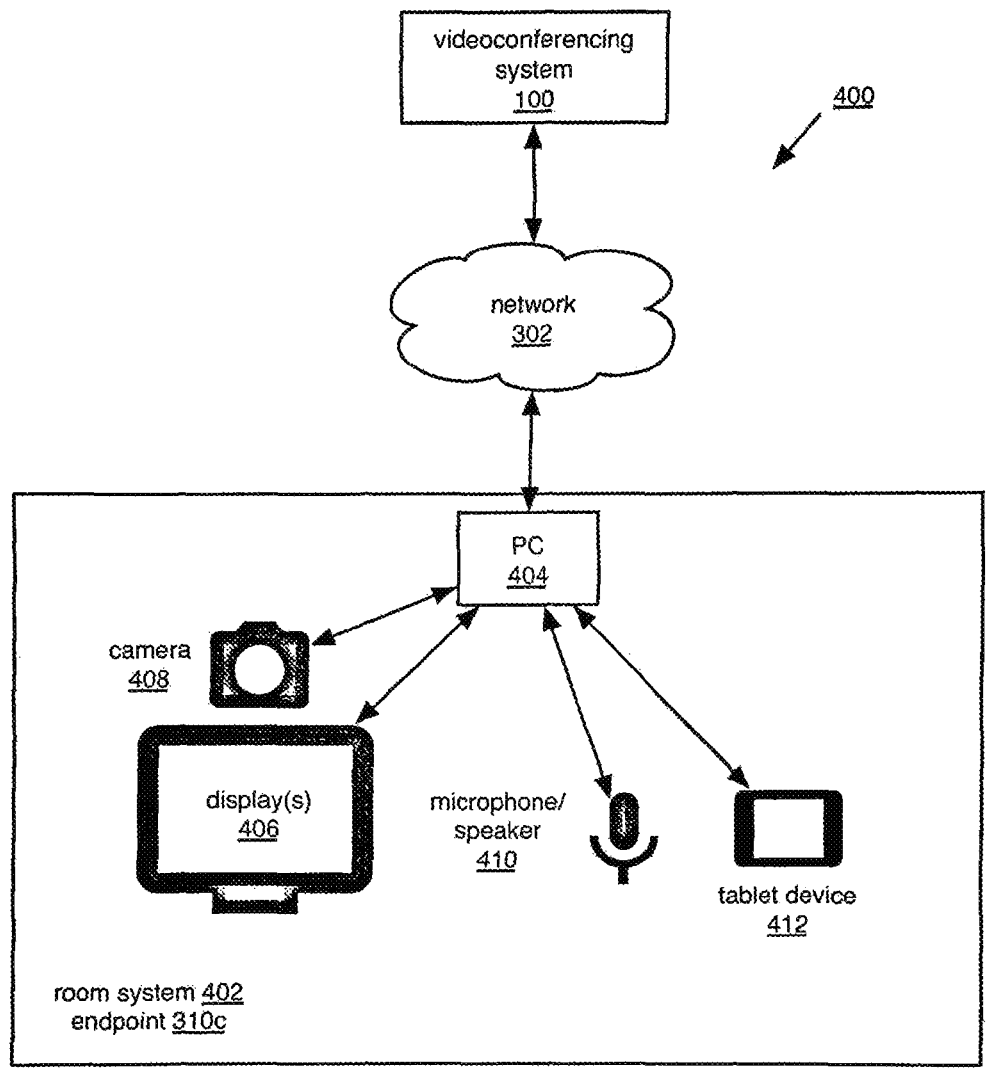
FIG. 4 depicts exemplary components of an exemplary room system endpoint in a video conferencing system in accordance with some embodiments of the invention.

FIG. 4 shows the components of an exemplary room system endpoint 310c in a video conferencing system 400. Room system 402, functioning as an endpoint 310c, may comprise a personal computer 404, one or more displays 406, a camera 408, a microphone and speaker 410, and a tablet device 412. Personal computer 404 may act as a hub for mediating data communications between some or all of the components of the room system endpoint 310c, and may be, for example, a small form-factor computer such as a Mac Mini or an Intel NUC (Next Unit of Computing) computer. Displays 406 may be a television, a monitor, or a projector and projector screen or white board. The microphone and speaker may be contained in a single device or multiple devices; in certain embodiments, the room system 402 may include multiple microphones and speakers. Tablet device 412 (alternatively, another mobile device such as a smartphone) may provide a user interface for controlling the video conferencing experience at room system 402.

Figure 5:
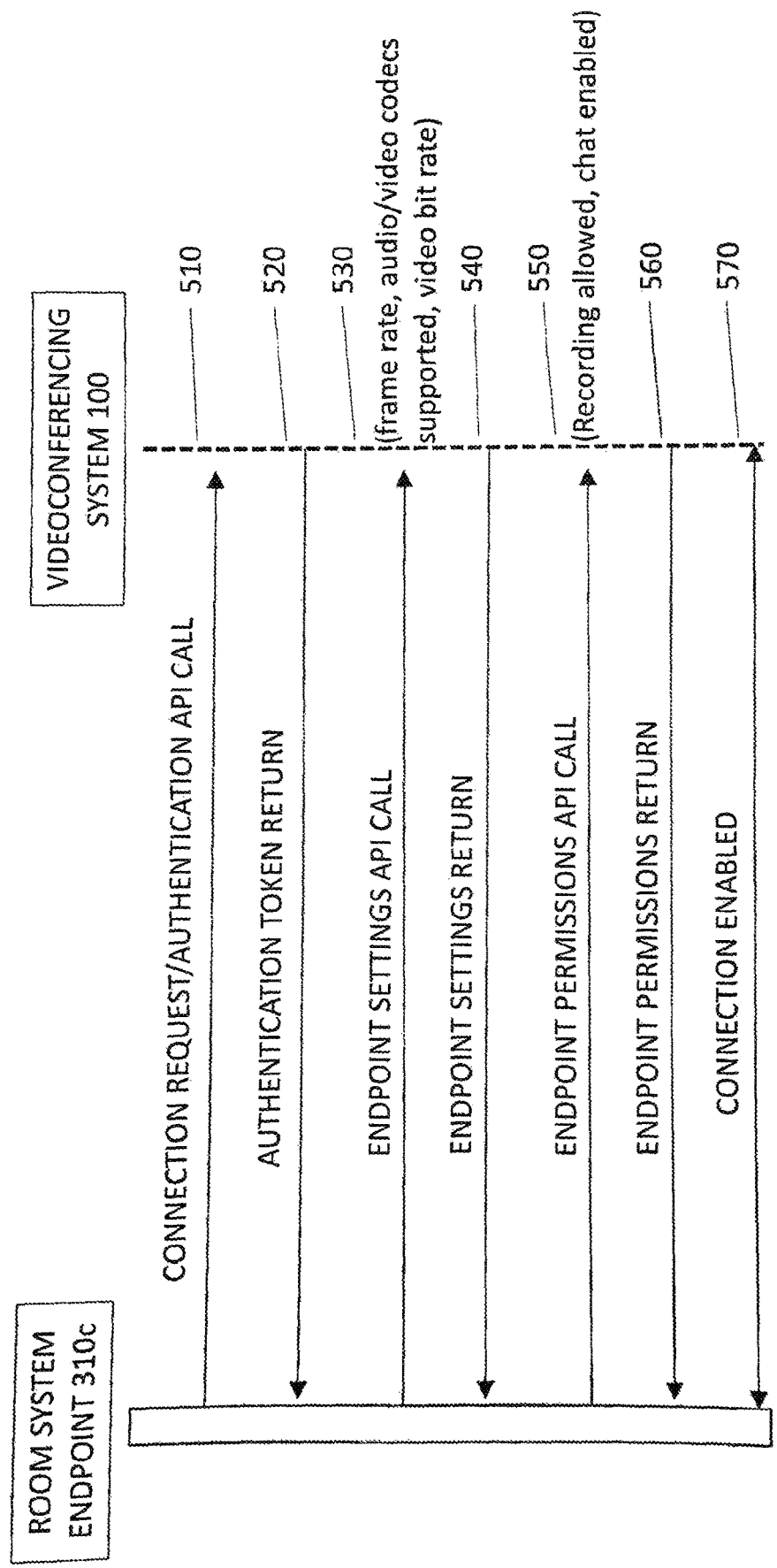
FIG. 5 depicts an exemplary flow chart of the steps to connect a user device to a video conference in accordance with some embodiments of the invention.

When a user connects to a video conference using room system endpoint 310c, room system endpoint 310c is authenticated by videoconferencing system 100 via network 302. Referring to FIG. 5, a connection request and authentication API call (step 510) allows for authenticating the connection request based on information provided by room system endpoint 310c. Videoconferencing system 100 generates an authentication token (step 520) and returns it to room system client 310c. After authentication, room system endpoint 310c conducts a handshake with videoconferencing system 100 through which settings and permissions are set. In step 530, room system endpoint settings API is called to setup settings with the server such as frame rate, audio and video codecs which are supported, desired video bitrate, etc. This can be through the use of one or multiple API calls from room system endpoint 310c to videoconferencing system 100. Next, endpoint settings are returned from videoconferencing system 100 back to room system endpoint 310c (step 540). Endpoint permissions API call is then sent from room system endpoint 310c to videoconferencing system 100 (step 550). In return, videoconferencing system 100 sends an endpoint permissions return (step 560). A successful connection to a video conference (step 570) is established between videoconferencing system 100 and room system endpoint 310c.

Figure 6:
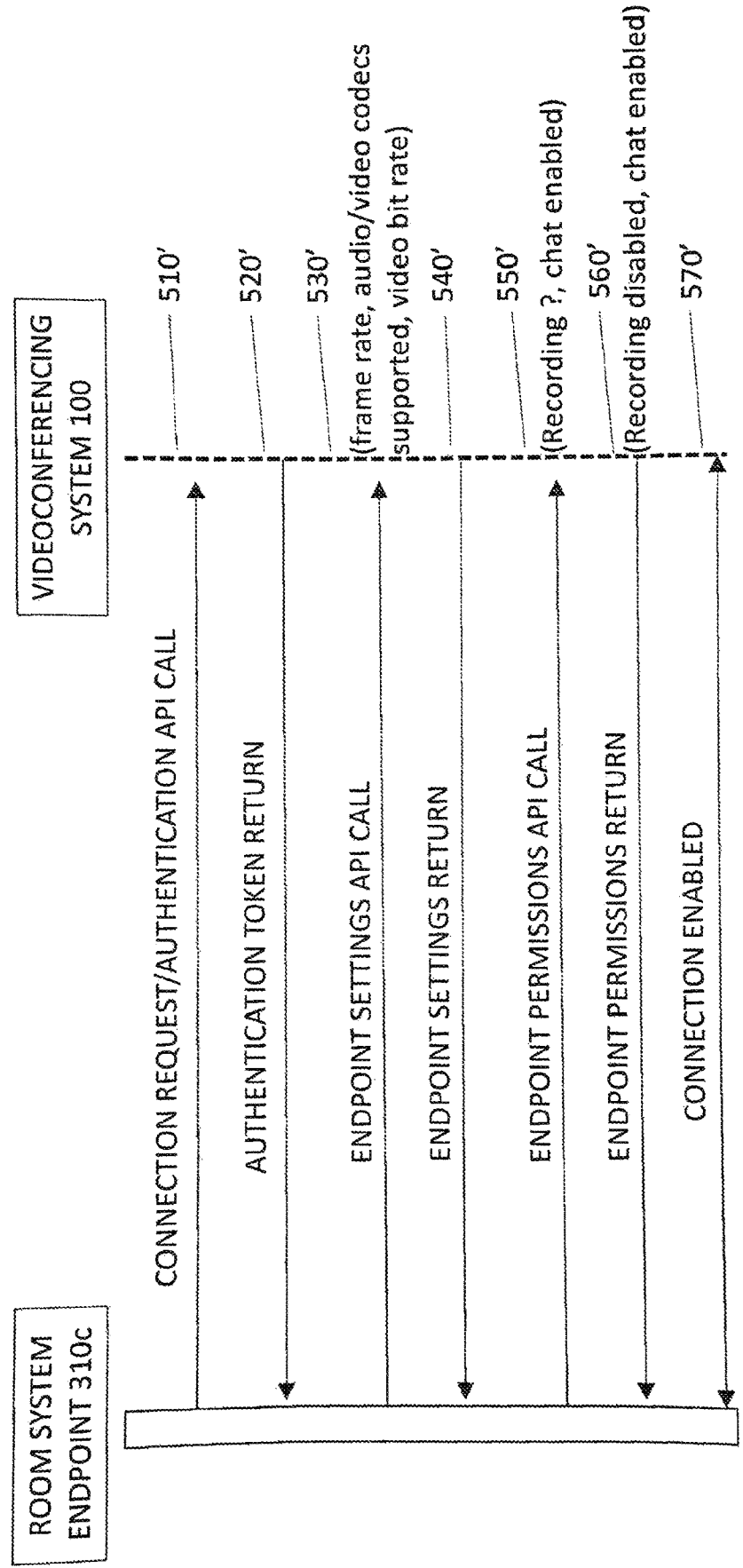
FIG. 6 illustrates an API call failure detected during the connection process as described in FIG. 5.

FIG. 6 shows a connection diagram when an API call failure is detected. During the connection process as described in FIG. 5, step 550' of FIG. 6 is shown with an API call failure for the user permission for recording the video conference. The failure could be an improper API call from room system endpoint 310c, noise along the transmission network, or some other error. In return, step 560' shows that videoconferencing system 100 sends a recording disabled default state back to room system endpoint 310c via endpoint permissions return. The API return with default settings allows a successful connection to the video conference without regard to the failed API call. Table 1 below shows an exemplary set of default, or base mode states for base mode operation via the API return if, for example, a failure is detected during setup of the video conference connection.

Base mode settings can be administratively preset for a minimum acceptable connection state for a given video conference.

TABLE 1

BASE MODE SETTINGS

| AUDIO | ON |
|---|---|
| VIDEO | OFF |
| RECORD | DISABLED |
| CHAT | DISABLED |

Figure 7:
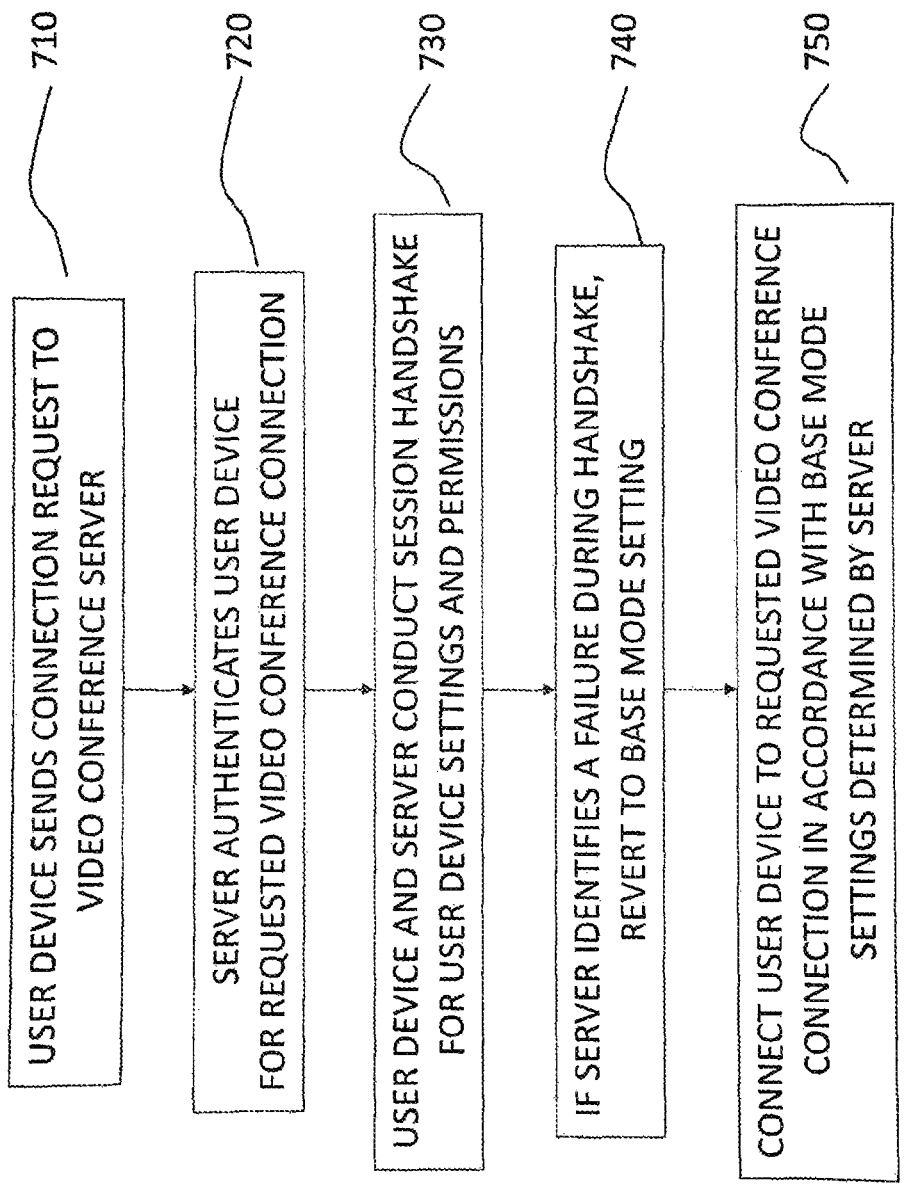
FIG. 7 shows a flow diagram of connection of a user device to a video conference session in accordance with embodiments of the present invention.

FIG. 7 shows a flow diagram of an exemplary connection of a user device to a video conference session. In step 710, a user device sends a connection request to a video conference server. When the request is received by the video conference server, in step 720, the server authenticates the user device for the requested conference session. Once authenticated, in step 730, the user device and server conduct a session handshake for the user device permissions and capabilities. The device permissions can be, for example, whether the user is allowed to record the video conference session via the user device, or also whether a chat feature can be enabled during the video conference. The user device capabilities can be a list of the peripheral devices which are available (i.e. video camera, microphone, speaker, etc.). If the server identifies any failure during the handshake in step 740, the server will revert to a base mode setting. Step 750 connects the user device to the requested video conference in accordance with the base mode settings.

While the foregoing description concerns actions associated with one user device, in various embodiments of the invention, the default, predefined configuration connection state may be propagated to other participant connections to the video conference so that all participants will have a common conference experience. Alternatively, or in addition, the default, predefined configuration connection state need not be associated only with an initial conference connection request. To that end, connection states for each conference participant may be monitored during the conference and assessed against preferred conference state parameter values to determine whether or not a particular conference state configuration state parameter should be reverted to its default state or value. In such an arrangement, the video conference connections are assessed according to a set of end point capabilities and account permissions during data exchanges with the video conference server. If and when the server detects a failure of one or more of the data exchanges, or other indicial of a degrading connection with one of the end points, it may revert the connection (and, optionally, those of the other participants as well) to a predefined configuration connection state for the affected configuration connection parameters. The video conference may then be continued in accordance with the predefined configuration connection state for the one or more configuration connection parameters so affected. Such monitoring may occur during and/or after a video conference connection process for the end points.

Figure 8:
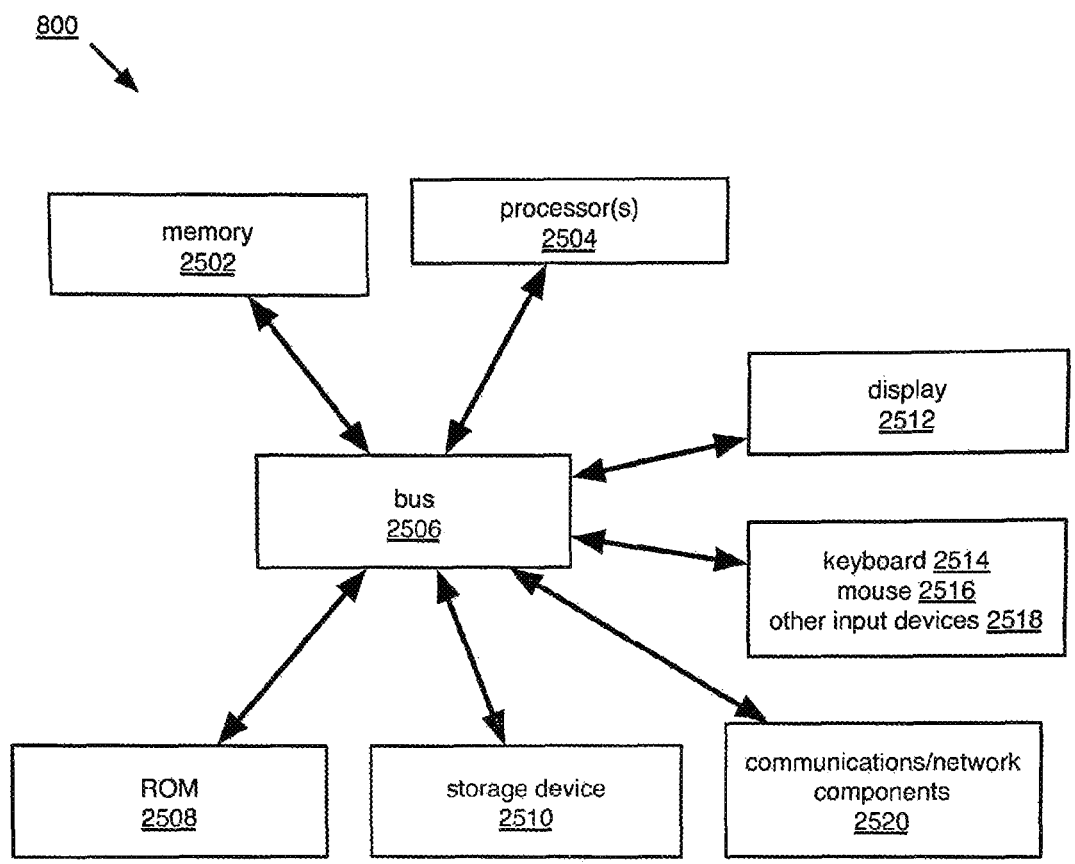
FIG. 8 shows a block diagram of an exemplary computing system in accordance with some embodiments of the invention.

FIG. 8 is a block diagram showing an exemplary computing system 800 that is representative any of the computer systems or electronic devices discussed herein. Note that not all of the various computer systems have all of the features of system 800. For example, systems may not include a display inasmuch as the display function may be provided by a client computer communicatively coupled to the computer system or a display function may be unnecessary.

System 800 includes a bus 2506 or other communication mechanism for communicating information, and a processor 2504 coupled with the bus 2506 for processing information. Computer system 800 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 800 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 800 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C #, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 800 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method, comprising:
   receiving, at a server, a request from a user device to connect to a video conference;
   authenticating, by the server, the user device request to access the video conference;
   performing, by the server and the user device, a plurality of data exchanges between the server and the user device in order to configure a video conference connection according to a set of user device capabilities and account permissions;
   during said data exchanges and before connecting the user device to the video conference, recognizing, by the server, a failure in said data exchanges that is caused by one or more of a failed application programming interface (API) call from the user device to the server, degrading network conditions between the user device and the server, noise along a transmission network between the user device and the server, connection issues between the user device and the server, and permissions mismatch;
   in response to recognizing the failure in said data exchanges, defaulting, by the server, to a predefined configuration connection state in order to provide the user device with a minimum connection state to the video conference; and
   connecting, by the server, the user device to the video conference in accordance with the predefined configuration connection state.

2. The method of claim 1, wherein the predefined configuration connection state is a set of configuration states.

3. The method of claim 1, wherein the predefined configuration connection state is at least one of an audio state and a video transmission state, a record state, and a chat mode state.

4. The method of claim 1, wherein the predefined configuration connection state is at least one of an audio state and a video transmission state.

5. The method of claim 1, wherein the predefined configuration connection state requires use of at least one audio and video codec.

6. A non-transitory computer-readable medium having stored thereon computer-readable instructions, which instructions when executed by a processor of a server, cause said processor to connect a user device with a video conference, the instructions including steps comprising:
   authenticating a request from the user device to access the video conference;
   performing a plurality of data exchanges between the server and the user device in order to configure a video conference connection according to a set of user device capabilities and account permissions;
   during said data exchanges and before connecting the user device to the video conference, recognizing a failure in said data exchanges that is caused by one or more of a failed application programming interface (API) call from the user device to the server, degrading network conditions between the user device and the server, noise along a transmission network between the user device and the server, connection issues between the user device and the server, and permissions mismatch;
   in response to recognizing the failure in said data exchanges, defaulting to a predefined configuration connection state in order to provide the user device with a minimum connection state to the video conference; and
   connecting the user device to the video conference in accordance with the predefined configuration connection state.

7. The non-transitory computer-readable medium of claim 6, wherein the predefined configuration connection state is a set of configuration states.

8. The non-transitory computer-readable medium of claim 6, wherein the predefined configuration connection state is at least one of an audio state and a video transmission state, a record state, and a chat mode state.

9. The non-transitory computer-readable medium of claim 6, wherein the predefined configuration connection state is at least one of an audio state and a video transmission state.

10. The non-transitory computer-readable medium of claim 6, wherein the predefined configuration connection state requires use of at least one audio and video codec.

11. A server for connecting a user device to a video conference, comprising:
    a processor communicably coupled to a memory, said memory storing instructions that, when executed by said processor, cause said processor to:
    receive a request from the user device to connect to the video conference;
    authenticate the user device request to access the video conference;
    perform a plurality of data exchanges between the server and the user device in order to configure a video conference connection according to a set of user device capabilities and account permissions;
    during said data exchanges and before connecting the user device to the video conference, recognize a failure in said data exchanges that is caused by one or more of a failed application programming interface (API) call from the user device to the server, degrading network conditions between the user device and the server, noise along a transmission network between the user device and the server, connection issues between the user device and the server, and permissions mismatch;
    in response to recognizing the failure in said data exchanges, default to a predefined configuration connection state in order to provide the user device with a minimum connection state to the video conference; and
    connect the user device to the video conference in accordance with the predefined configuration connection state.

12. The server of claim 11, wherein the predefined configuration connection state is a set of configuration states.

13. The server of claim 11, wherein the predefined configuration connection state is at least one of an audio state and a video transmission state, a record state, and a chat mode state.

14. The server of claim 11, wherein the predefined configuration connection state is at least one of an audio state and a video transmission state.

15. The server of claim 11, wherein the predefined configuration connection state requires use of at least one audio and video codec.

* * * * *